United States Patent [19]

Tezuka et al.

[11] Patent Number: 5,267,135
[45] Date of Patent: Nov. 30, 1993

[54] POWER SUPPLY APPARATUS HAVING INTERLOCKING OPERATING SYSTEM

[75] Inventors: Yasuaki Tezuka, Tokyo; Mitsuru Irishima, Miyagi, both of Japan

[73] Assignee: NEC Corporation, Japan

[21] Appl. No.: 798,110

[22] Filed: Nov. 26, 1991

[30] Foreign Application Priority Data

Nov. 26, 1990 [JP] Japan .................... 2-124771[U]

[51] Int. Cl.[5] ............................................ H02M 7/517
[52] U.S. Cl. ........................................ 363/49; 363/65
[58] Field of Search .................... 363/16, 49, 65, 95

[56] References Cited

U.S. PATENT DOCUMENTS

| | | | |
|---|---|---|---|
| 3,573,600 | 4/1971 | Carlisle | 363/71 |
| 4,191,992 | 3/1980 | Johannessen | 363/70 |
| 4,538,073 | 8/1985 | Freige et al. | 363/71 |
| 4,783,728 | 11/1988 | Hoffman | 363/71 |
| 4,814,963 | 3/1989 | Peterson | 363/71 |
| 4,872,102 | 10/1989 | Getter | 363/141 |
| 4,894,764 | 1/1990 | Meyer et al. | 363/65 |
| 5,032,971 | 7/1991 | Yamada | 363/65 |
| 5,121,315 | 6/1992 | Moriya | 363/65 |
| 5,122,726 | 6/1992 | Elliot et al. | 363/72 |
| 5,130,561 | 7/1992 | Elliot et al. | 363/72 |
| 5,164,890 | 11/1992 | Nakagawa et al. | 363/65 |

Primary Examiner—J. L. Sterrett
Attorney, Agent, or Firm—Ostrolenk, Faber, Gerb & Soffen

[57] ABSTRACT

According to this invention, a power supply apparatus includes a first power supply unit, a second power supply unit, and an interlocking starting circuit. The first power supply unit has a first power supply terminal connected to a power supply, a first converter for converting a voltage of the power supply terminal into a predetermined voltage, and a switch for connecting/disconnecting the power supply through the first power supply terminal. The second power supply unit has a second power supply terminal connected to an output of the switch and a second converter for converting a voltage of the second power supply terminal into a predetermined voltage. The interlocking starting circuit is connected to the output of the switch and interlocks and starts the first and second power supply units.

9 Claims, 6 Drawing Sheets

POWER SUPPLY APPARATUS HAVING INTERLOCKING OPERATING SYSTEM

BACKGROUND OF THE INVENTION

The present invention relates to an interlocking operating system between two power supply units in a power supply apparatus.

In a plug-in type power supply apparatus requiring different output voltages (e.g., five different voltages of +9 V, +5 V, −2.1 V, −5.2 V, and −9 V) having a large current capacity, since the number of plug-in connectors which can be mounted on one package is limited, an interlocking operating system constituted by a plurality of power supply units is required.

In a conventional interlocking operating system constituted by two power supply units, as shown in a block diagram of a conventional interlocking operating system of FIG. 2, a power supply unit 1 having a switch 3 in an input stage has a starting circuit 11 and an interlocking circuit 12, and a power supply unit 2 having no switch has a starting circuit 9 having the same arrangement as that of the starting circuit 17 and an interlocking circuit 10 having the same arrangement as that of the interlocking circuit 12. Reference numerals 4 and 6 denote DC/DC converters, and reference numerals 5 and 8 denote control circuits. When a voltage is applied to inputs IN1 and IN2 of a power supply system, the power supply unit 2 is set in a standby state by the starting circuit 9 and supplies a signal to the interlocking circuit 12 of the power supply unit 1 through the interlocking circuit 10. In this state, when the switch 3 of the power supply unit 1 is manually turned on, the power supply unit 1 is started and supplies a signal to the interlocking circuit 10 of the power supply unit 2 through the interlocking circuit 12 so as to release the standby state of the power supply unit 2, thereby starting the power supply unit 2.

FIG. 3 is a block diagram showing the conventional interlocking operating system of FIG. 2 in detail. In FIG. 3, reference numerals 104 and 120 denote power supply circuits; 105 and 121, input voltage monitor circuits; 107 and 123, interlocking signal transmission circuits; 108 and 124, interlocking signal reception circuits; 110 and 126, PWM (Pulse Width Modulation) circuits; 111 and 127, output voltage error amplification circuits; 113 and 129, input smoothing capacitors; 114 and 130, switching transistors; 115 and 131, voltage transformers; 116 and 132, rectification diodes; and 117 and 133, output smoothing capacitors.

In FIG. 3, in an ON state of the switch 3 of the first power supply unit 1, when a voltage is applied to the inputs IN1 and IN2 of the system and exceeds a threshold level of the monitor circuits 105 and 121, starting signals are supplied from the monitor circuits 105 and 121 to the interlocking signal transmission circuits 107 and 123.

The interlocking signal transmission circuits 107 and 123 which receive the starting signals send interlocking signals to the interlocking signal reception circuits 108 and 124 of the first and second power supply units, respectively.

The interlocking signal reception circuits 108 and 124 calculate logic AND products between the interlocking signals from the first and second power supply units to send the starting signals to the PWM circuits 110 and 126.

The PWM circuits 110 and 126 which receive the starting signals start their modulating operations to send drive signals to the gates of the switching transistor 114 and 130, thereby enabling the DC/DC converters 4 and 6. For this reason, the first and second power supply units 1 and 2 start their operations. That is, since each of the first and second power supply units 1 and 2 calculates the logic AND product between the interlocking signals, the first and second power supply units 1 and 2 start their operations to be interlocked to each other regardless of the closing operation of the switch 3 and an order of voltage application to the inputs IN1 and IN2.

Note that output voltage data of the first and second power supply units 1 and 2, i.e., the DC/DC converters 4 and 6, are received and amplified in the output voltage error amplification circuits 111 and 127 and subjected to pulse width modulation so as to drive the transistors 114 and 130, thereby stabilizing an output voltage.

As described above, in the conventional interlocking operating system, since independent starting circuits and interlocking circuits are arranged in each of the power supply units, the circuit arrangement is complicated. In addition, when these power supply unit are plug-in type power supply units using a connector, in the power supply unit having no switch, a charge/discharge current flows to the input smoothing capacitors 113 and 129 (generally having a capacitance of several hundreds $\mu F$) of the input of the power supply unit when the plug is inserted or drawn, thereby causing an inrush current to flow. Therefore, welding of the pins of the connector may occur.

SUMMARY OF THE INVENTION

It is an object of the present invention to provide a power supply apparatus having an interlocking starting means with a simple circuit arrangement.

In order to achieve the above object of the present invention, there is provided a power supply apparatus comprising a first power supply unit having a first power supply terminal connected to a power supply, a first converter for converting a voltage of the power supply terminal into a predetermined voltage, and a switch for connecting/disconnecting the power supply through the first power supply terminal, a second power supply unit having a second power supply terminal connected to an output of the switch and a second converter for converting a voltage of the second power supply terminal into a predetermined voltage, and interlocking starting means, connected to the output of the switch, for interlocking and starting the first and second power supply units.

DESCRIPTION OF THE PREFERRED EMBODIMENTS

Figure 1:
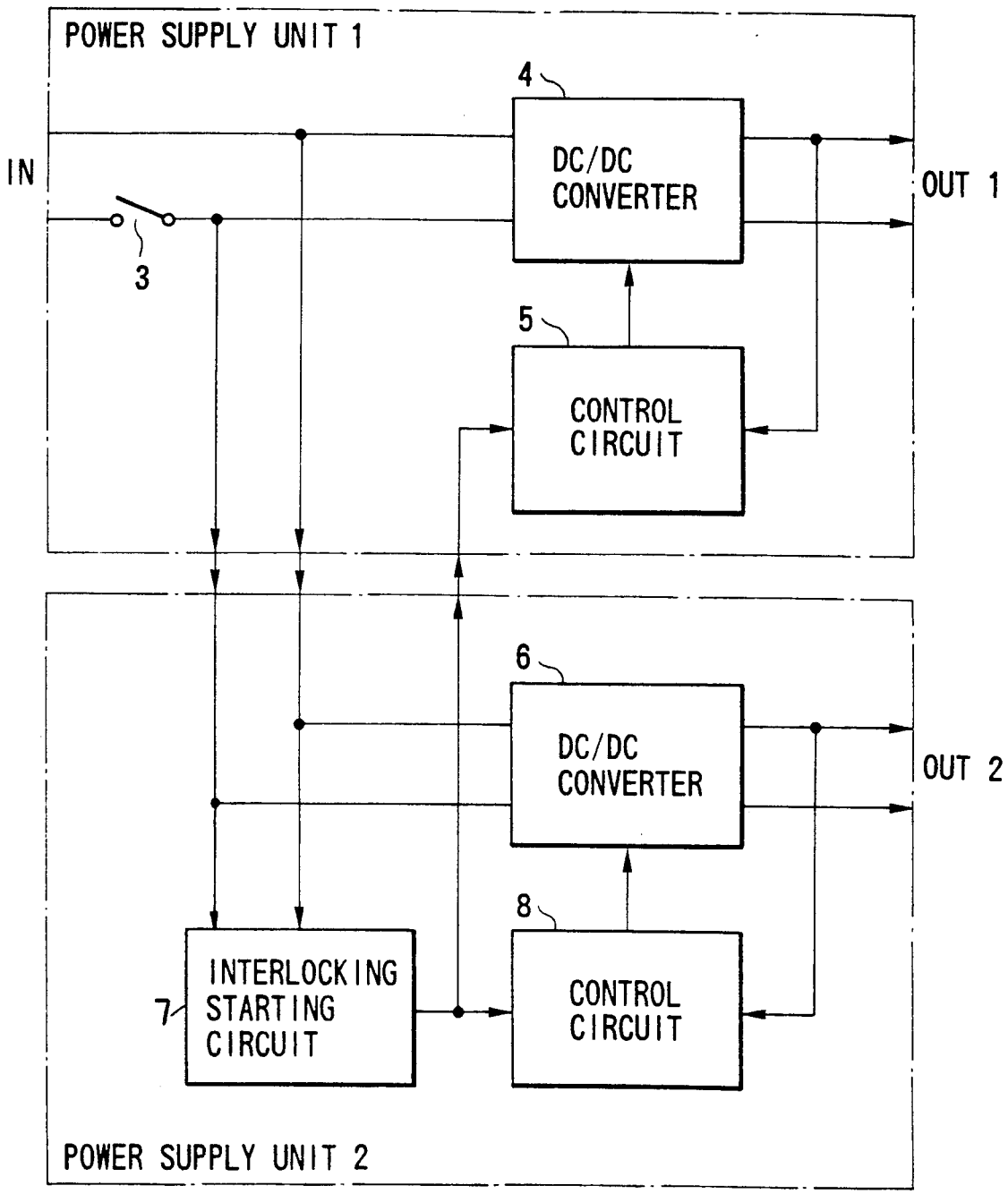
FIG. 1 is a block diagram showing a power supply apparatus according to an embodiment of the present invention.

Embodiments of the present invention will be described below with reference to the accompanying drawings. FIG. 1 is a block diagram according to an embodiment of the present invention.

Figure 2:
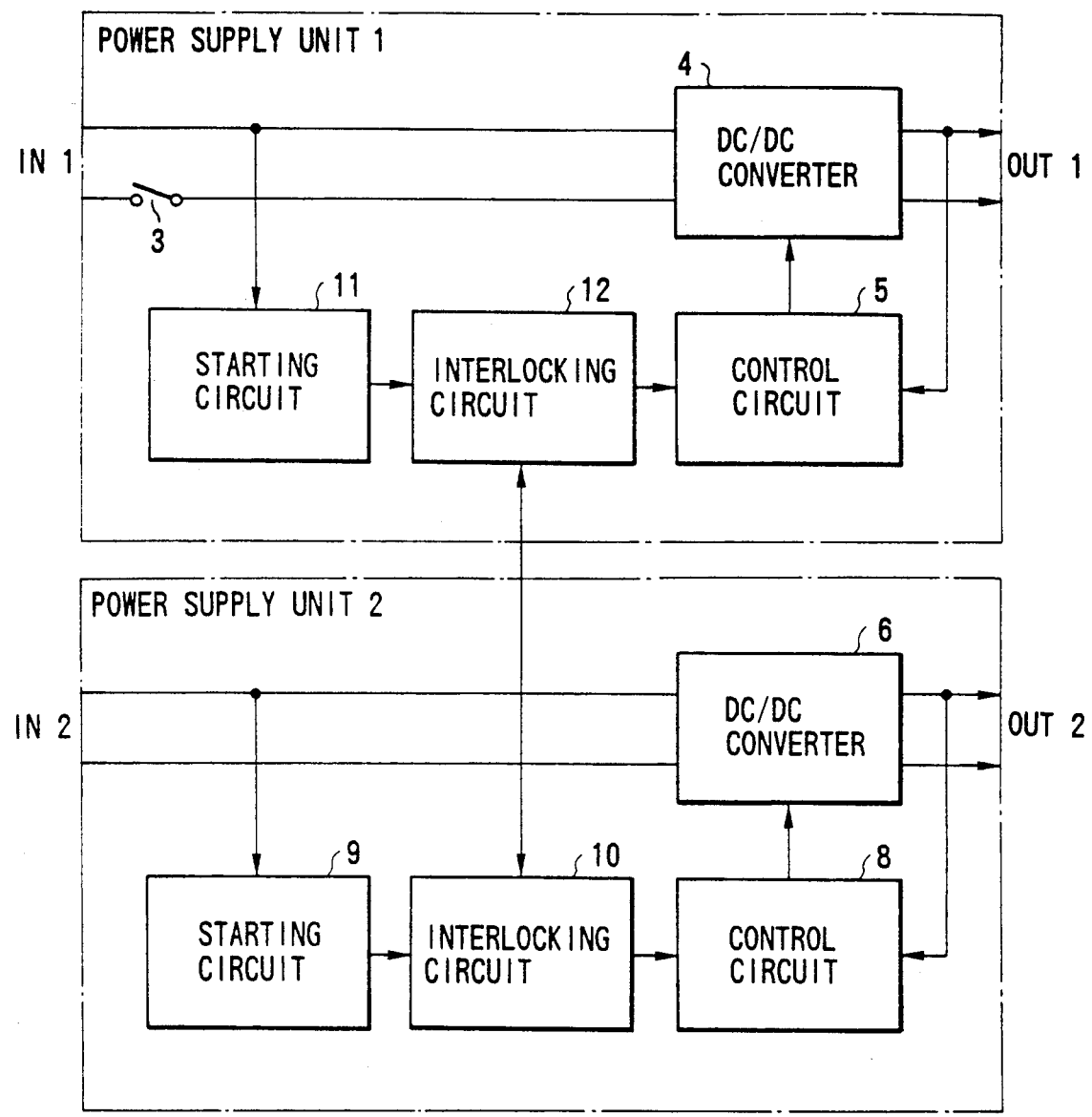
FIG. 2 is a block diagram showing a conventional power supply apparatus.

In this embodiment, as shown in FIG. 1, a power supply apparatus has a power supply unit 1 having a switch 3 for switching connection to a power supply and a power supply unit 2 having no switch for switching connection to the power supply. In addition, as characteristic features of the present invention, the power supply terminal of the power supply unit 2 is connected to the non-power-supply terminal as the output of the switch 3, and the power supply unit 2 has a interlocking starting circuit 7 serving as an interlocking starting means for interlockingly starting the power supply unit 2 and the power supply unit 1. DC/DC converters 4 and 6 and control circuits 5 and 8 have the same arrangements as described in FIG. 2.

An operation of this embodiment will be described below.

When the switch 3 of the power supply unit 1 is turned on, a power supply voltage is applied to an input IN of the power supply unit 1, a power supply voltage and a starting signal are supplied to the control circuits 5 and 8 of the power supply units 1 and 2 by the interlocking starting circuit 7 arranged in the power supply unit 2. Therefore, the control circuits 5 and 8 enable the DC/DC converters 4 and 6 to simultaneously start the supply units 1 and 2.

Figure 3:
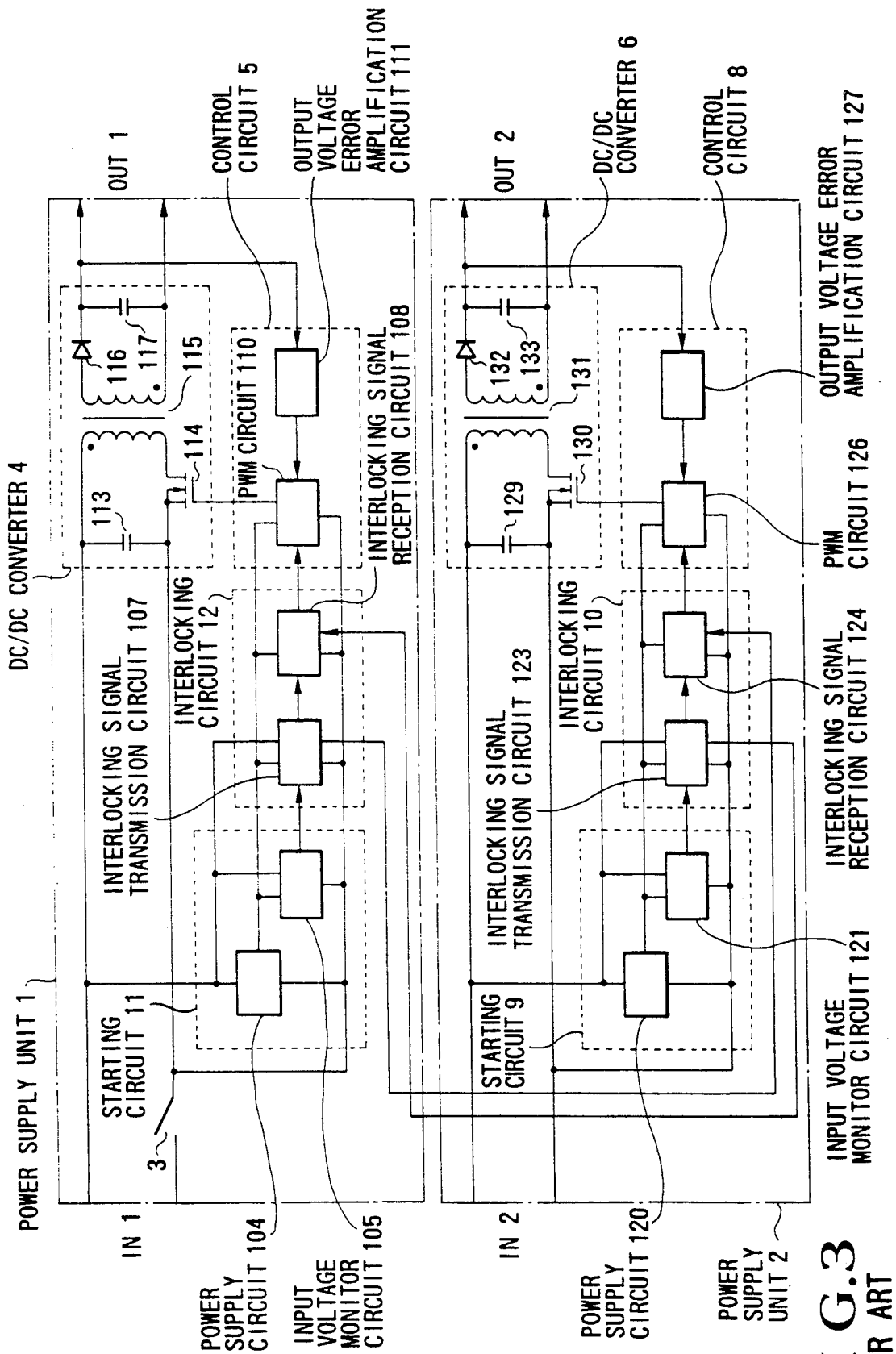
FIG. 3 is a block diagram showing the power supply apparatus of FIG. 2 in detail.
Figure 4:
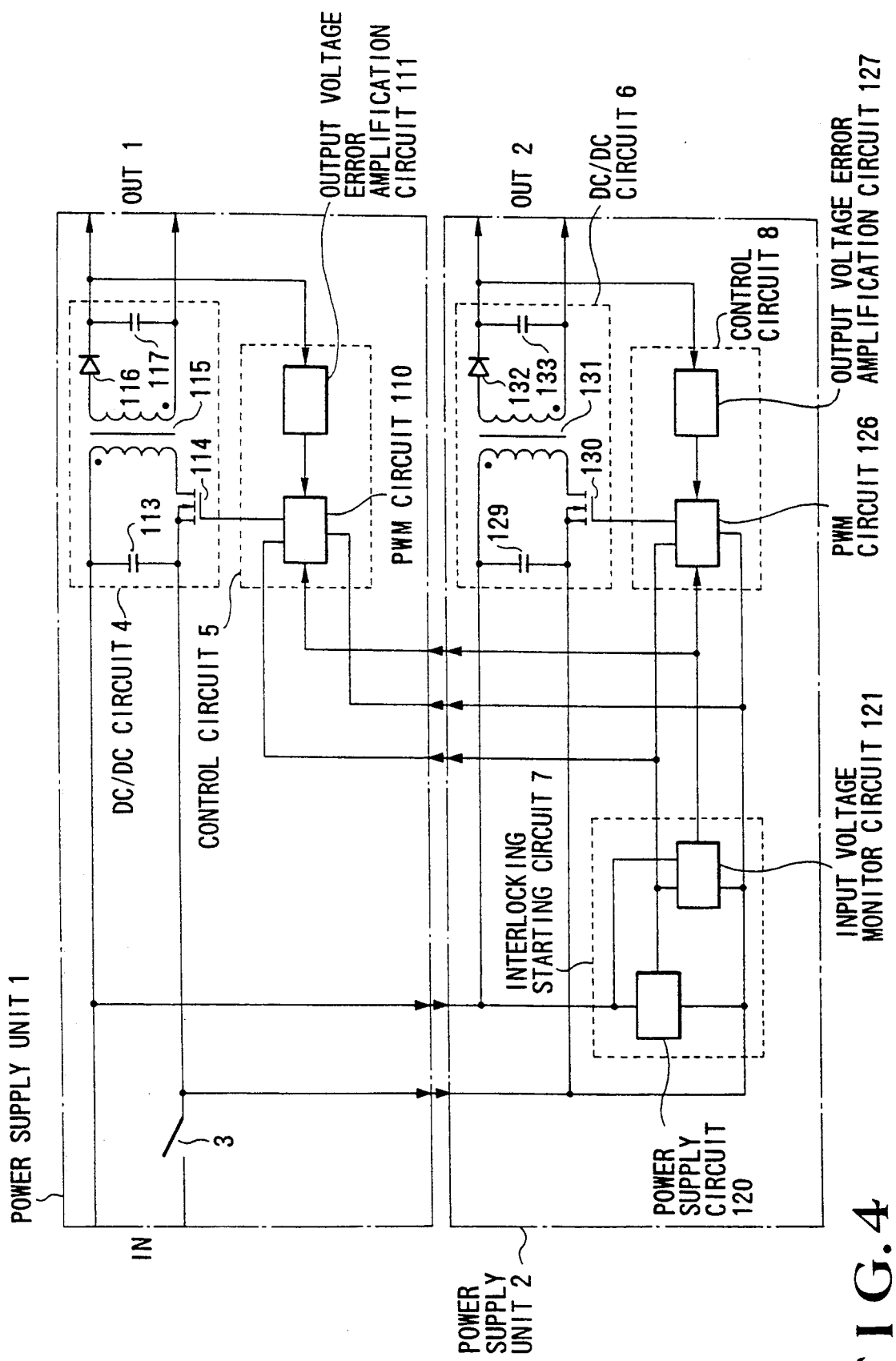
FIG. 4 is a block diagram showing a power supply apparatus of FIG. 1 in detail.

FIG. 4 is a block diagram showing a power supply apparatus of FIG. 1 and 3 in detail. The same reference numerals as in FIG. 1 denote the same parts in FIG. 4, and a detailed description thereof will be omitted. In FIG. 4, the interlocking starting circuit 7 constituted by a power supply circuit 120 and a input voltage monitor circuit 121 outputs a power supply voltage and a starting signal to PWM circuits 110 and 126 of the control circuits 5 and 8. Therefore, the control circuits 5 and 8 receive the same starting signal after the power supply voltage is received, so as to simultaneously enable the DC/DC converters 4 and 6.

Figure 5:
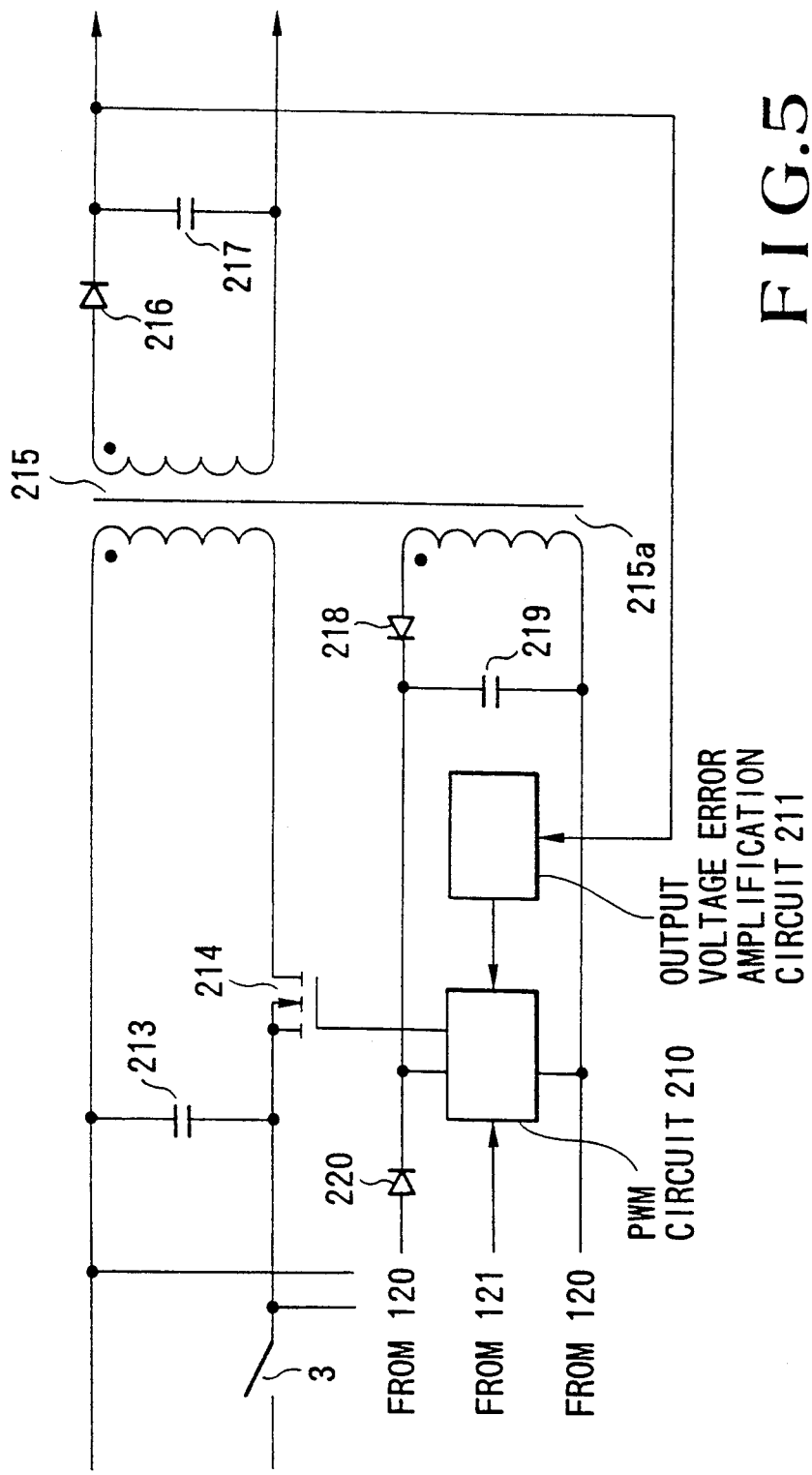
FIG. 5 is a block diagram showing a main part of a power supply apparatus according to a modification of FIG. 4.

FIG. 5 shows a modification of the power supply unit 1 in FIG. 4. In FIG. 5, reference numeral 210 denotes a PWM circuit; 211, an output voltage error amplification circuit; 215, a voltage transformer having an auxiliary winding 215a; 214, a switching transistor; 213, 217, and 219, capacitors; and 216, 218, and 220, diodes. With the above arrangement, during a starting operation, a power supply voltage is applied from the power supply circuit 120 of the power supply unit 2 to the auxiliary winding 215a of the voltage transformer 215. After the starting operation, a voltage induced from the auxiliary winding 215a of the voltage transformer 215 is rectified and smoothed by the diode 218 and the capacitor 219 to back up the apparatus. In this case, after the starting operation, the power supply from the power supply circuit 120 may be stopped.

In the above embodiment, although the starting circuit 7 may be arranged on the power supply unit 2, it may be arranged on the power supply unit 1. In this case, the power supply units 1 and 2 respectively serve as main and sub units, and a plurality of power supply units 2 serving as sub units may be arranged.

Figure 6:
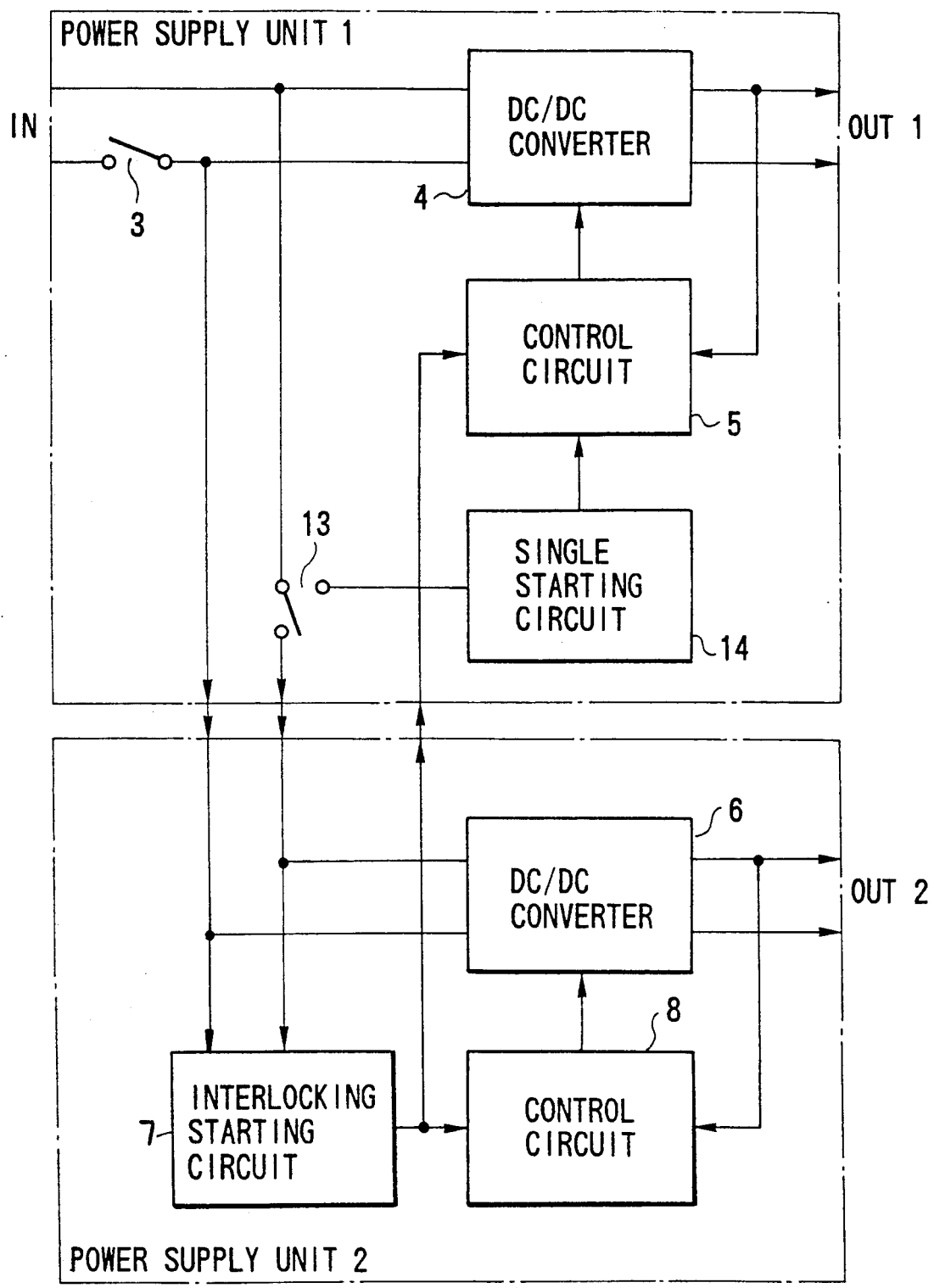
FIG. 6 is a power supply apparatus according to another embodiment of the present invention.

As shown in FIG. 6, when a single starting circuit 14 is arranged on the power supply unit 1, the power supply unit 1 can be independently used. A power supply voltage is applied to the single starting circuit 14 by switching a switch 13 to the power supply unit 1 opposite to the side shown in FIG. 6, and the power supply unit 1 can be independently started without using the power supply unit 2.

As described above, according to the present invention, the input of a power supply unit having no switch is connected to the output of a power supply unit having a switch, and a starting circuit is arranged on the power supply unit having no switch, thereby obtaining an interlocking operation. For this reason, the cost of materials of parts can be reduced, and the reliability of the power supply apparatus can be improved.

Even when the present invention is applied to a plug-in type power supply apparatus in an OFF state of the switch, welding of a connector pin can be advantageously prevented upon insertion or drawing of the power supply unit having no switch.

In addition, when the specifications of the switch OFF are known, a starting circuit may be arranged on the power supply unit having a switch in a detaching-/attaching operation of the power supply unit, and an operation can also be performed by only a single power supply unit.

What is claimed is:

1. A power supply apparatus comprising:
    first power supply means having a first power supply terminal connected to a power supply, a first converter for converting a voltage of said power supply terminal into a first predetermined voltage, and a switch for connecting and disconnecting said power supply through said first power supply terminal;
    second power supply means having a second power supply terminal connected to an output of said switch and a second converter for converting a voltage of said second power supply terminal into a second predetermined voltage; and
    interlocking starting means, connected to the output of said switch, for interlocking and starting said first and second power supply means by a single, common interlocking signal, said single, common interlocking signal being provided simultaneously to both said first and second power supply means, wherein said interlocking starting means is arranged on said second power supply means.

2. An apparatus according to claim 1, wherein said first and second power supply means are plug-in type power supply means using connectors.

3. An apparatus according to claim 1, wherein said interlocking starting means has input voltage monitor means for simultaneously outputting said interlocking signal to said first and second power supply means when an input voltage exceeds a threshold level.

4. An apparatus according to claim 1, wherein said first and second power supply means have first and second control means for enabling said first and second converters on the basis of said interlocking signal of said interlocking starting means, respectively.

5. An apparatus according to claim 4, wherein said first and second control means further receive an operating power supply voltage from said interlocking starting means.

6. A power supply apparatus comprising:

first power supply means having a first power supply terminal connected to a power supply, a first converter for converting a voltage of said power supply terminal into a first predetermined voltage, and a switch for connecting and disconnecting said power supply through said first power supply terminal;

second power supply means having a second power supply terminal connected to an output of said switch and a second converter for converting a voltage of said second power supply terminal into a second predetermined voltages; and interlocking starting means, connected to the output of said switch, for interlocking and starting said first and second power supply means;

wherein said first power supply means has an auxiliary winding arranged in a voltage transformer comprised in said first converter, and backup means for rectifying and smoothing a voltage induced in said auxiliary winding and supplying the induced voltage to a first control means for enabling said first converter.

7. A power supply apparatus comprising:

first power supply means having a first power supply terminal connected to a power supply, a first converter for converting a voltage of said power supply terminal into a first predetermined voltage, and a switch for connecting and disconnecting said power supply through said first power supply terminal;

second power supply means having a second power supply terminal connected to an output of said switch and a second converter for converting a voltage of said second power supply terminal into a second predetermined voltage; and interlocking starting means, connected to the output of said switch, for interlocking and starting said first and second power supply means, wherein said first power supply means has single starting means for starting said first power supply means.

8. An apparatus according to claim 7, wherein said interlocking starting means is arranged on said second power supply means.

9. An apparatus according to claim 7, further comprising a switch for selectively supplying an input voltage to said interlocking starting means and said single starting means.

* * * * *